United States Patent (12)
Takasugi et al.

(10) Patent No.: US 6,636,279 B2
(45) Date of Patent: Oct. 21, 2003

(54) DISPLAY DEVICE AND METHOD OF MANUFACTURING THE SAME

(75) Inventors: Shinji Takasugi, Yokohama (JP); Hideo Iiyori, Sagamihara (JP)

(73) Assignee: International Business Machines Corporation, Armonk, NY (US)

(*) Notice: Subject to any disclaimer, the term of this patent is extended or adjusted under 35 U.S.C. 154(b) by 257 days.

(21) Appl. No.: 09/682,102

(22) Filed: Jul. 20, 2001

(65) Prior Publication Data

US 2002/0008793 A1 Jan. 24, 2002

(30) Foreign Application Priority Data

Jul. 24, 2000 (JP) .................................. 2000-222318

(51) Int. Cl.⁷ ............................................ G02F 1/1368
(52) U.S. Cl. ............................ 349/40; 349/42; 349/139
(58) Field of Search ........................... 349/40, 42, 43, 349/54, 55, 139, 140, 143, 187; 257/50, 59, 355, 72, 530; 438/30; 361/56, 58, 91, 111

(56) References Cited

U.S. PATENT DOCUMENTS 5,373,377 A * 12/1994 Ogawa et al. ............... 349/40
5,671,026 A * 9/1997 Shiraki et al. ............... 349/40
5,852,480 A * 12/1998 Yajima et al. ............... 349/40
5,949,502 A * 9/1999 Matsunaga et al. ........... 349/40

* cited by examiner

Primary Examiner—James Dudek
Assistant Examiner—Tai Duong
(74) Attorney, Agent, or Firm—Derek S. Jennings

(57) ABSTRACT

A Thin Film Transistor (TFT) array substrate has a dummy signal line as a short circuit wiring for preventing a short circuit due to electrostatic breakdown between a signal line as an upper layer wiring and a gate line as a lower wiring. The dummy signal line is formed on an outer peripheral area of the TFT array substrate. This dummy signal line has a three-layer structure of a silicon lower layer, an Indium Tin Oxide (ITO) intermediate layer and an aluminum (Al) upper layer, enumerated from the lower layer. Although the silicon layer is formed as one consecutive wiring during formation thereof, the silicon layer is etched simultaneously with the Al layer when the Al layer is subjected to pattern forming, and is electrically disconnected between the gate lines. Since the dummy wiring is disconnected after its formation, a short circuit does not occur between the gate lines even in the case where the dummy wiring and two or more of the gate lines are short-circuited with each other.

13 Claims, 10 Drawing Sheets

DISPLAY DEVICE AND METHOD OF MANUFACTURING THE SAME

BACKGROUND OF INVENTION

The present invention relates to a display device, a method of manufacturing the same and a wiring board for a display device. More particularly, the invention relates to a display device with a short-circuit wiring representing a short circuit due to the electrostatic breakdown between the wirings by short-circuiting with another wiring, a method of manufacturing the same and a wiring board.

As an image display device for a personal computer or other various monitors, a liquid crystal display (LCD) device has been remarkably widespread. In general, the liquid crystal display device includes a liquid crystal display panel with a drive circuit, and a backlight unit disposed on a back surface thereof. The display panel displays an image by controlling light transmitted therethrough. The display panel includes a display area made from a plurality of sub-pixels disposed in the form of matrix, and an outer peripheral area formed in an outer periphery thereof. Among the liquid crystal display devices, there is an active matrix LCD in which each sub-pixel has a switching element such as a Thin Film Transistor (TFT) and a Metal Insulator Metal (MIM).

Since the active matrix LCD is able to perform a subtle gray-scale display and has a high contrast, it is widely adopted for a high-definition display device or a color LCD device. The color LCD device is typically formed by sealing liquid crystal between an array substrate and a color filter substrate with color filters, the array substrate having switching elements, pixel electrodes and the like formed in the form of array. The color LCD has a color filter, each of R, G and B for each sub-pixel, and performs a color display by controlling a quantity of light from each sub-pixel. Three sub-pixels of R, G and B form one pixel. Note that, in a monochrome LCD, each sub-pixel corresponds to the pixel.

FIG. 1 is a conventional view schematically showing a sub-pixel with a TFT as a switching element. Only a sub-pixel that is formed on the TFT substrate side is shown. In FIG. 1, a bottom gate type TFT is shown which uses amorphous silicon (a-Si) as a semiconductor. Besides this, there exist a bottom gate type TFT using polysilicon as a semiconductor, or a top gate type TFT and the like. The bottom gate type TFT is a TFT in which a gate of the TFT is disposed in a lower layer than a layer of a drain/source.

In the drawing, a reference numeral 11 denotes a TFT as a switching element; a numeral 12 a gate electrode; a numeral 13 a gate insulating layer; a numeral 14 an amorphous silicon (a-Si) layer; a numeral 15 an ohmic layer improving an ohmic contact between the a-Si layer and electrodes; a numeral 16 a source electrode; a numeral 17 a drain electrode; and a numeral 18 a pixel electrode applying an electric field to liquid crystal. The ohmic layer 15 is doped with P or As as a donor. The gate electrode 12 is connected to a Y axis side driver IC (not shown) via a gate line 19, and the source electrode 16 is connected to an X-axis side driver IC (not shown) via a signal line 20. Note that, since the TFT 11 is driven by an alternating current, the polarities of the source electrode 16 and the drain electrode 17 are inverted with the passage of time.

An operation of the sub-pixel will now be described. A signal is sent from the Y-axis driver IC via the gate line 19 to each gate electrode 12. By this signal, a gate voltage of the TFT 11 is manipulated to turn on/off the TFT 11. Moreover, a signal is sent from the X-axis driver IC via the signal line 20 to the source electrode 16. Whether or not the signal is transmitted from the source electrode 16 to the drain electrode 17 is controlled by the gate electrode 12. An amplitude of a signal voltage to the drain electrode 17 is controlled by changing a signal voltage value from the X-axis driver IC to the source electrode 16. The pixel electrode 18 having the signal voltage sent from the drain electrode 17 applies a voltage to the liquid crystal, between the pixel electrode 18 and a common electrode (not shown) formed on an opposing substrate. The gray-scale display can be performed by changing the voltage applied to the liquid crystal.

FIG. 2 is a constructional view schematically showing a TFT array substrate. In the drawing, a reference numeral 21 denotes a display area; reference numeral 22 is an outer peripheral area; reference numeral 23 are signal lines; reference numeral 24 are gate lines; and reference numeral 25 are short rings. In manufacturing the TFT array substrate, wirings 25 called short rings are formed at the outside of the display area 21. Each short ring is a wiring in which end terminals of each signal line and gate line are short-circuited with each other in order to prevent electrostatic breakdown in an active matrix wiring.

However, each short ring 25 functions only after completing the gate line 24 and the signal line 23. Therefore, particularly in the case where the signal line 23 has a plurality of layers, there has been a problem that a short circuit occurs between the signal line 23 and the gate line 24 before an uppermost layer of the signal line 23 is attached. Moreover, it has been known that the electrostatic breakdown frequently occurs particularly between the most external signal line of the display area 21 and a gate line thereunder. This is because an electric charge causing the electrostatic breakdown is apt to accumulate on a substrate end since the substrate end is grasped or contacts with a device when the substrate is carried, and thus it is conceived that the electrostatic breakdown is apt to occur between the external electric conductors.

As means for preventing such electrostatic breakdown before the completion of the signal line, a dummy signal line is formed on the outer peripheral area. This is a wiring formed at the further outside of the most external signal line in the display area in an electrically floating state. This dummy line has the same construction as that of the signal line, and is formed at the same time when the signal line is formed. By forming such a dummy signal line, a short circuit due to the electrostatic breakdown may occur between the gate line and the dummy signal line, thus the defect due to the short circuit between the signal line and the gate line can be prevented.

However, even in the case where the dummy line is formed in the above-described manner, there has been a problem that the dummy line causes a short circuit with two or more of the gate lines. In such a case where short circuits occur at two or more spots, two gate lines are electrically connected to each other thus causing a defect called an inter-gate-line short circuit. In order to prevent such a short circuit therebetween, it is conceived that the dummy line between the gate lines is previously cut. However, when the dummy line is disconnected in such a manner as described above, since capacitance of each of the cut dummy lines is decreased, there has been a problem that the electrostatic breakdown occurs not between the dummy line and the gate line but between the most external signal line and gate line.

SUMMARY OF INVENTION

In order to solve the foregoing problems, the feature of the present invention is to obtain a display device, a method of manufacturing the same and a wiring board for a display device, which are capable of preventing the short circuit between the wirings.

Another feature of the present invention is to obtain a display device, a method of manufacturing the same and a wiring board for a display device, which are capable of, even in the case where the dummy line and other two or more wirings are short-circuited, for eliminating a short circuit between the two or more wirings. Still another feature of the present invention is to obtain a display device, a method of manufacturing the same and a wiring board for a display device, which are capable of, even in the case where the dummy line and other two or more wirings are short-circuited, for eliminating the short circuit between the two or more wirings, and also capable of maintaining an aptitude to cause the short circuit in the dummy wiring.

When grasped as a method of manufacturing a display device, a first aspect of the present invention is a method of manufacturing a display device with a display area having a plurality of sub-pixels disposed in the form of matrix, the method comprising the steps of: forming a plurality of lower layer wirings on a substrate, the lower layer wiring sending electric signals to a plurality of sub-pixels; forming an insulating layer on the plurality of lower layer wirings; forming, on the insulating layer, a plurality of upper layer wirings sending electric signals to the plurality of sub-pixels and a short circuit wiring at the outside of the plurality of upper layer wirings and at the outside of the display area; and removing the whole short circuit wiring, alternatively removing a part thereof, to disconnected electrically the short circuit wiring.

When grasped as a method of manufacturing a display device, another aspect of the present invention is a method of manufacturing a display device with a display area having a plurality of sub-pixels disposed in the form of matrix, said method comprising the steps of: forming a plurality of lower layer wirings on a substrate, the lower layer wirings sending electric signals to the plurality of sub-pixels; forming an insulating layer on the plurality of lower layer wirings; forming a plurality of upper layer wirings and a short circuit wiring on the insulating layer, the upper layer wiring sending electric signals to the plurality of sub-pixels; and removing the whole short circuit wiring, alternatively removing a part thereof to electrically disconnected the short circuit wiring, wherein a short circuit due to dielectric breakdown between the short circuit wiring and the lower layer wirings is more apt to occur than between the upper layer wirings and the lower layer wirings, alternatively than between the lower layer wirings.

When grasped as a display device, yet another aspect of the present invention is a display device with a display area constituted of a plurality of sub-pixels disposed in the form of matrix, comprising: a substrate; a plurality of lower layer wirings sending electric signals to the plurality of sub-pixels, the lower layers being formed on the substrate; an insulating layer formed on the plurality of lower layer wirings; a plurality of upper layer wirings sending electric signals to the plurality of sub-pixels, the upper layer wirings being formed on the insulating layer; and a short circuit wiring formed at the outside of the plurality of upper layer wirings and at the outside of said display area, the short circuit wiring being formed on said insulating layer, wherein the whole short circuit wiring is removed, alternatively a part thereof is removed after being formed, to be electrically disconnected.

When grasped as a wiring board, still another aspect of the present invention is a wiring board, comprising: a plurality of lower layer wirings formed on a substrate; an insulating layer formed on the lower layer wirings; a plurality of upper layer wirings formed on the insulating layer; a short circuit wiring repressing a short circuit between the upper layer wirings, alternatively between the lower layer wirings, by short-circuiting with the lower layer wirings via the insulating layer, the short circuit wiring being formed on the insulating layer, wherein the whole short circuit wiring is removed, alternatively a part thereof is removed after being formed, to be electrically disconnected.

When grasped as a display device, a still further aspect of the present invention is a display device with a display area constituted of a plurality of sub-pixels disposed in the form of matrix, comprising: a substrate; a plurality of lower layer wirings sending electric signals to the plurality of sub-pixels, the lower layer wirings being formed on the substrate; an insulating layer formed on the plurality of lower layer wirings; a plurality of upper layer wirings sending electric signals to the plurality of sub-pixels, the upper layer wirings being formed on the insulating layer; and a short circuit wiring formed on the insulating layer, wherein the short circuit wiring is short-circuited with the lower layer wirings via the insulating layer, and the short circuit wiring is electrically disconnected after being formed.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

DETAILED DESCRIPTION

Figure 1:
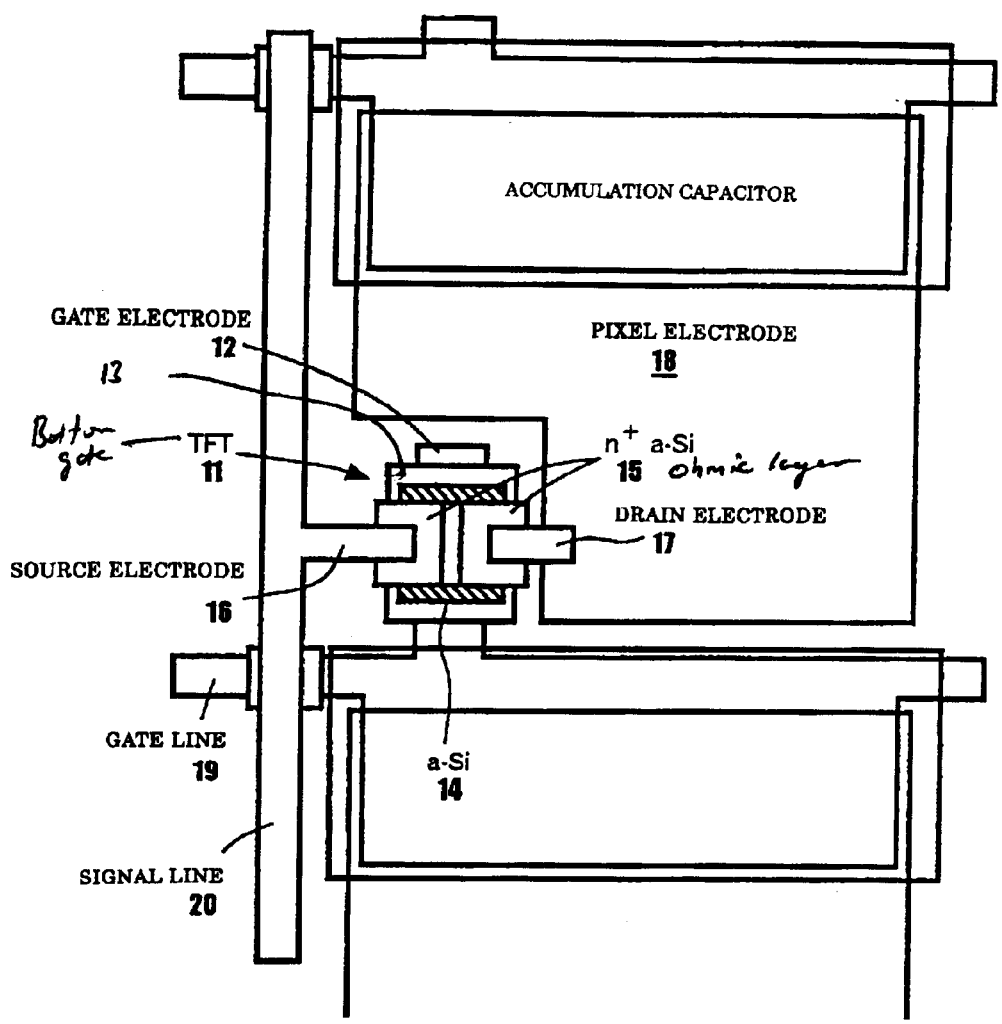
FIG. 1 is a conventional view schematically showing a sub-pixel in the prior art.
Figure 2:
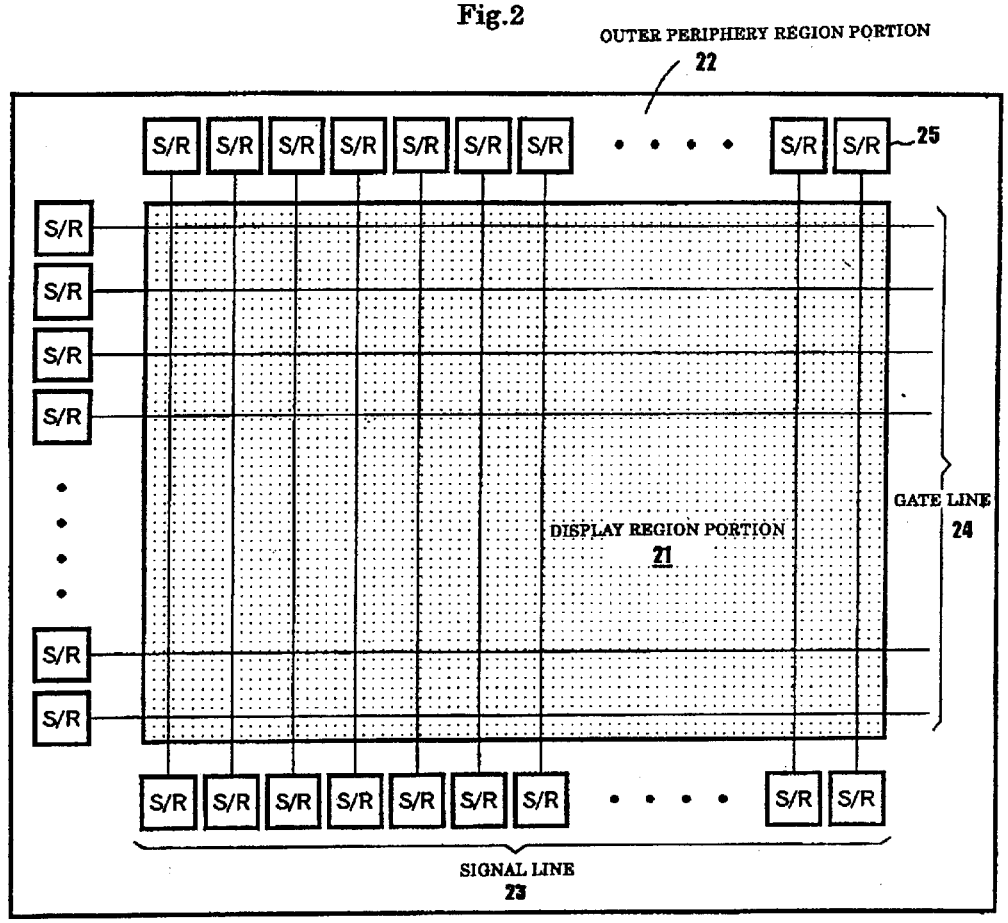
FIG. 2 is a conventional view schematically showing a TFT array substrate in the prior art.

For a liquid crystal display, the display device includes all of the liquid crystal displays, each of which has a liquid crystal cell with liquid crystal sealed between two substrates, a driver IC mounted to the liquid crystal cell, and the other devices such as a backlight. Note that it is possible to form the short circuit wirings simultaneously with the upper layer wirings and to remove the same when the upper layer wirings are etched.

Preferably, the short circuit wiring has a plurality of layers, and the removing step preferably remove a part of a lower layer of the short circuit wiring when an upper layer thereof is etched, to disconnected the short circuit wiring electrically. Moreover, preferably, the short circuit wiring has the same composition as that of the upper layer wiring. Having the same composition means that there are the same number of layers formed of the same material, and does not mean that structures thereof are the same. Alternatively, it is preferable that the short circuit wirings have capacitance approximately equal to or more than that of the upper layer wiring.

The lower layer wirings can be gate lines connected to gates of TFTs formed in the sub-pixels, the upper layer wirings can be signal lines connected to source/drain electrodes of the TFTs, the short circuit wiring can have the same composition as that of the signal lines and can be formed simultaneously with the signal lines, and the signal lines and the short circuit wiring can have an Si lower layer and an Al upper layer, and the Si lower layers can be disconnected when the Al upper layer is etched. The signal lines and the short circuit wiring can further include an ITO intermediate layer between the Si lower layer and the Al upper layer, the ITO intermediate layer can be formed being separated into a plurality of wirings, and the Si lower layer can be disconnected in a part exposed from a separating portion of the ITO intermediate layer.

Herein below, description will be made for an embodiment of the present invention with reference to the drawings. The respective drawings are made for describing the embodiment, and dimensions and shapes shown in the drawings do not always reflect an actual device and a method of manufacturing the same, accurately.

A Thin Film Transistor (TFT) array substrate in this embodiment includes a dummy signal line as a short circuit wiring for preventing a short circuit due to electrostatic breakdown between a signal line as an upper layer wiring and a gate line as a lower wiring. The dummy signal line is formed on an outer peripheral area of the TFT array substrate. This dummy signal line has a three-layer structure of a silicon lower layer, an Indium Tin Oxide (ITO) intermediate layer and an aluminum (Al) upper layer, enumerated from a lower layer. Although the silicon layer is formed as one consecutive wiring during formation thereof, it is etched simultaneously with the Al layer when the Al layer is subjected to pattern forming, and is electrically disconnected among the respective gate lines. Note that the term "disconnect" means that a separate portion is formed by removing a part of the wiring consecutively formed, and does not include a wiring previously formed separately.

Figure 3:
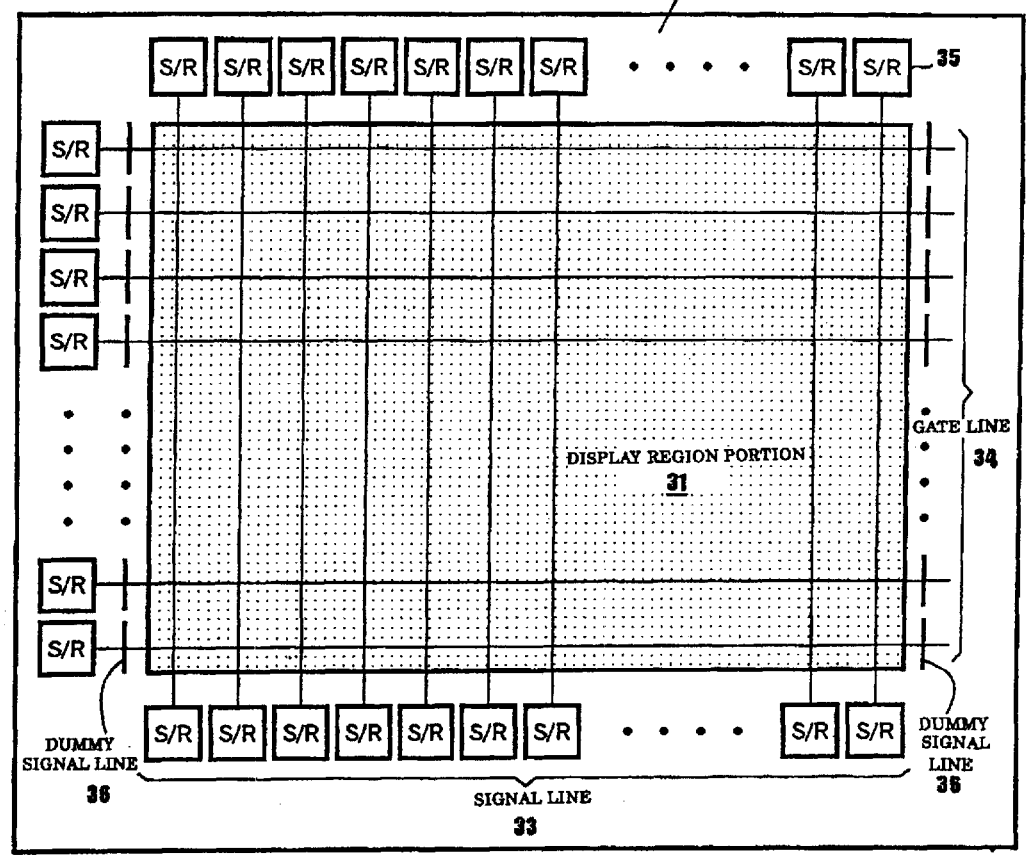
FIG. 3 is a constructional view schematically showing a TFT array substrate in the embodiment 1.

FIG. 3 is a constructional view schematically showing the TFT array substrate in this embodiment, which has a wiring pattern already formed thereon. In the drawing, a reference numeral 31 denotes a display area made of sub-pixels disposed in the form of matrix, signal lines 33 each send a signal to the source electrode of the TFT. Gate lines 34 each send a signal to the gate electrode of the TFT. An outer peripheral area 32 is located outside the display area 31. Further shown are short rings 35 and dummy signal lines 36. The short rings 35 and the dummy wirings 36 are formed on the outer peripheral area 32. The dummy wirings 36 are formed at the outside of the most external signal line of the signal lines on the display area 31. In this embodiment, the dummy wirings 36 are respectively formed at the outside of both sides of the display area 31 respectively. The general construction of the display area 31 is the same as that of the TFT array wiring in the prior art and detailed description thereof will be omitted. Note that, in the color LCD, each sub-pixel is provided with the color filters of R, G and B, and the color display is performed by controlling the quantity of light from each sub-pixel. Three sub-pixels of R, G and B form one pixel. Note that, in the monochrome LCD, each sub-pixel corresponds to the pixel.

Figure 4:
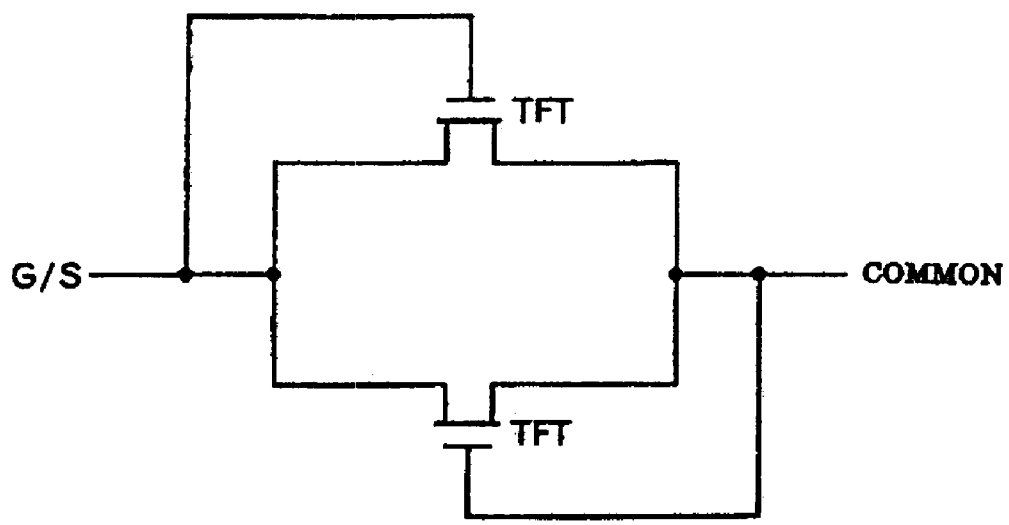
FIG. 4 is a circuit diagram schematically showing a short ring in the embodiment 1.

FIG. 4 is a circuit diagram showing the construction of the short ring. Each gate line and signal line are connected to one short ring, and each short ring is connected to a common wiring. The short ring is made of two TFTs, and has two terminals. The gate line or the signal line is connected to one terminal, and the common wiring is connected to the other terminal. The gate line/signal line is connected to one end of the source/drain of the first TFT, and is connected to one end of the source/drain of the second TFT.

The common wiring is connected to one end of the source/drain of the gate of the second TFT, and further, is connected to one end of the source/drain of the first TFT. After completing the signal line, the short circuit due to the electrostatic breakdown is repressed since the signal line and the gate line are connected to this short ring. When a high voltage is applied to the circuit, the circuit is put in a low resistance state since the TFT is turned on. When the voltage is low, the circuit is put in a high resistance state since the TFT is turned off. Since a voltage usually used is about 5V, a trouble due to the high resistance does not occur.

The gate line 34 is made of aluminum. The signal line 33 is made from the silicon layer, the Indium Tin Oxide (ITO) layer and the aluminum layer, enumerated from the lower layer. The silicon layer comprises a lower a-Si layer and an upper n+a-Si layer. The dummy signal line 36 has the same composition as that of the signal line 33, and is formed simultaneously with the signal line 33. FIG. 9(B) is a sectional view showing a final structure of the dummy line 36. The dummy signal line has a three-layer structure of a silicon layer 66, an ITO layer 68 and an Al layer 93 or 94. The silicon layer 66 is formed of two layers of an a-Si layer and an n+a-Si ohmic layer. A silicon oxide layer 67 is attached onto the full surface of a glass substrate. The final dummy line is put in a state where all of the three layers are separated between the gate lines 53.

Description will be made for a method of manufacturing a TFT array substrate in this embodiment. The description will be focused on a TFT array wiring having a bottom gate type (reverse stagger type) TFT. In the bottom gate type TFT, the gate electrode and the gate line are formed in the lower layer, and an insulating layer is deposited thereon. On this insulating layer, the source/drain electrodes and the signal line are disposed. As a semiconductor material, a-Si is used. Each wiring and the insulating film are formed by deposition of the materials, a photolithography process and an etching process. The deposition of the materials is performed by physical vapor deposition such as a sputtering method and vacuum evaporation, alternatively by chemical vapor deposition such as plasma CVD. The photolithography process is performed by the respective processes of attachment of photoresist, exposure thereof via a mask pattern, formation of a resist pattern by developing, and resist stripping.

The etching process is performed by dry etching such as plasma sputtering and RIE sputtering, alternatively by wet etching using an etching liquid. A preferred one among these is selected for each step. These processes are techniques widely known, and detailed description thereof will be omitted. Note that, the short rings 35 are formed on the outer peripheral area 32 simultaneously with the formation of the TFT and each wiring to be described later.

Figure 5:
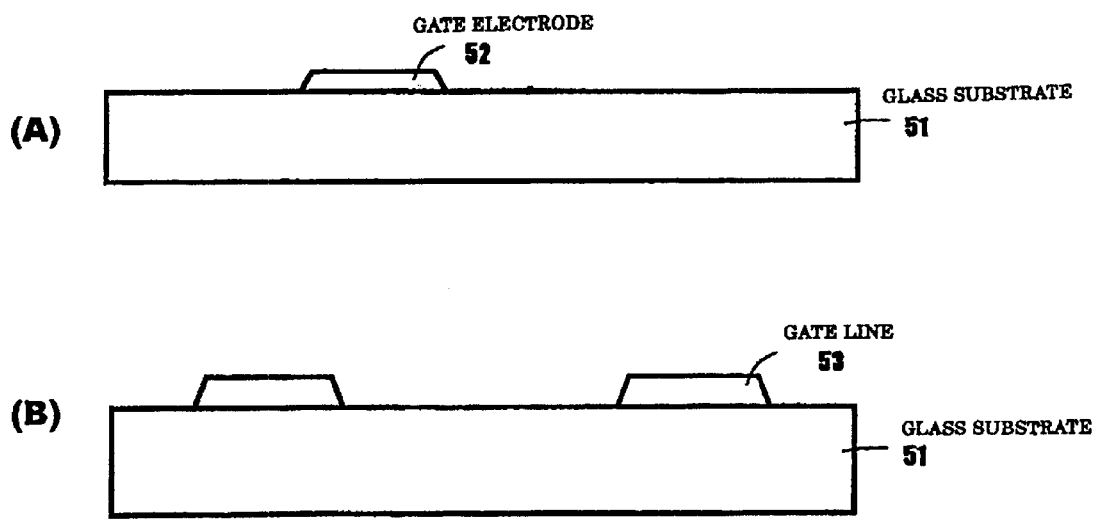
FIGS. 5(A) and 5(B) are constructional views schematically showing a method of forming a TFT array substrate wiring in the embodiment 1.

Herein below, description will be made for the formation of the dummy wiring on the array substrate in comparison with the formation of the TFT. First, with reference to FIG. 5, the formation of the gate line layer will be described. On the full surface of a glass substrate 51, the Al layer having a thickness of 1000 to 5000 angstrom, preferably 2000 angstrom, is deposited by a sputtering method. Next, the photoresist is deposited on the full surface of the Al layer, and subjected to the exposure and developing processes, thus forming the pattern of the photoresist. With this resist as a protective film, the Al layer is etched by wet etching, thus forming a gate electrode 52 and a gate line 53. A line width of the gate line 53 is about 10 to 30 micrometers. Thereafter, the resist is stripped, and the forming process of the gate line layer is completed.

Figure 6:
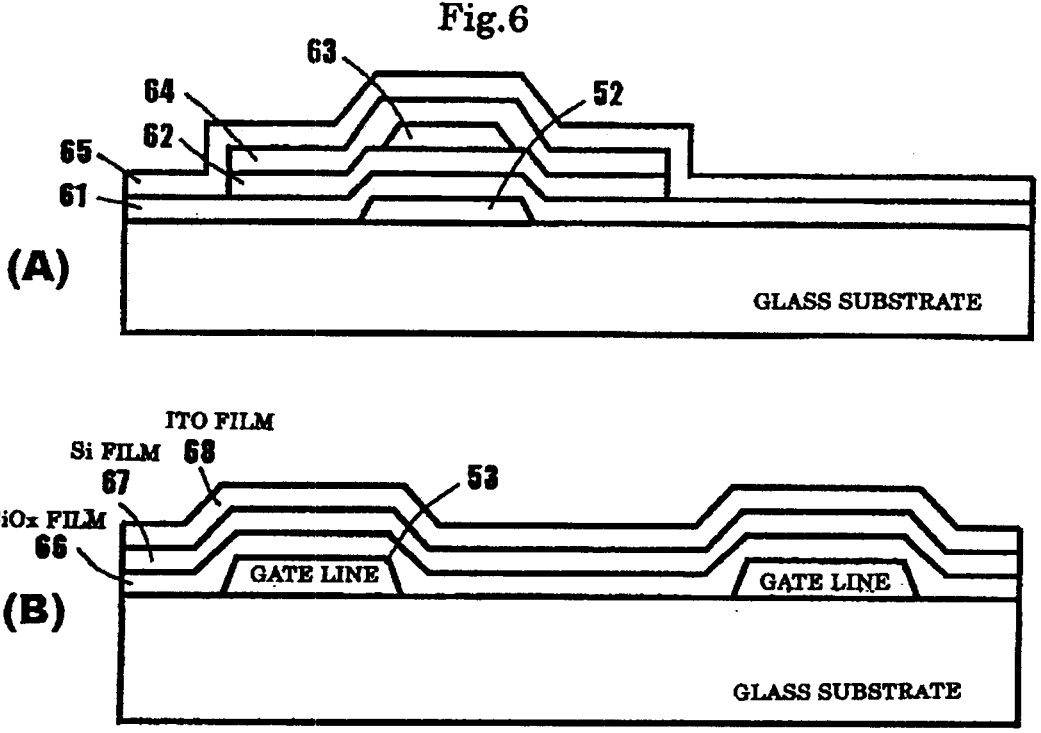
FIGS. 6(A) and 6(B) are constructional views schematically showing the method of forming a TFT array substrate wiring in the embodiment 1.

Next, description will be made with reference to FIG. 6. First, an oxide insulating layer is formed. A silicon oxide (SiOx) film is deposited on the full surface of the substrate by use of plasma CVD. In the TFT, the silicon oxide layer functions as a gate insulating layer 61. In the signal line, alternatively in the dummy wiring, the silicon oxide layer functions as the insulating layer 66 between the gate line 53 and the signal line/dummy line. The SiOx film is deposited with a thickness of about 1500 to 6000 angstrom, preferably 3500 angstrom. Subsequently, an amorphous silicon layer is deposited with a thickness of 200 to 1000 angstrom, preferably 500 angstrom, by the plasma CVD.

Further, a silicon nitride (SiNx) layer 63 as an etching protective film is deposited by the plasma CVD. The etching protective film is deposited in order to prevent the oxide film of the lower layer from being etched. The nitride protective film 63 is subjected to pattern forming by means of the photolithography process and the wet etching process. Thereafter, an n+a-Si layer as an ohmic layer is deposited by the plasma CVD. The a-Si layer and the n+a-Si layer are simultaneously subjected to the photolithography process and the etching process, thus forming patterns of an a-Si layer 62 and an n+a-Si layer 64. The a-Si layer and the n+a-Si layer are formed also as the first layer (Si layer) 67 in the signal line and the dummy line. A line width of the signal line is about 5 micrometers.

Figure 7:
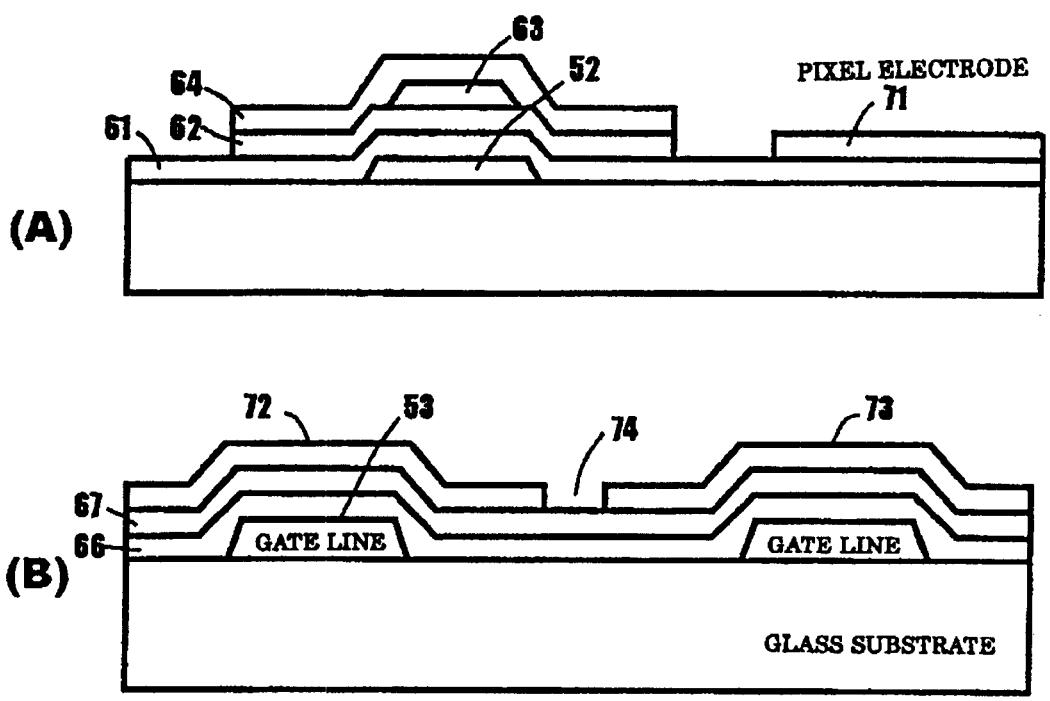
FIGS. 7(A) and 7(B) are constructional views schematically showing the method of forming a TFT array substrate wiring in the embodiment 1.

Next, ITO layers 65 and 68 are deposited with a thickness of 300 to 2000 angstrom, preferably 400 angstrom, on the full surface of the substrate by the sputtering method. A specified pattern is formed by the photolithography process and the dry etching process (FIG. 7). The ITO layer functions as a pixel electrode 71, as well as is formed as second layers 72 and 73 of the signal line and the dummy line. In the dummy line, the ITO layer is formed being separated between the gate lines 53. As a matter of course, in the signal line, the ITO layer is not separated, and is formed as one consecutive wiring. As described above, though the ITO layer is separated, the lower Si layer 67 is connected to the dummy wiring, accordingly, the capacitance of the dummy wiring has a volume approximately equal to that of the signal line.

Figure 8:
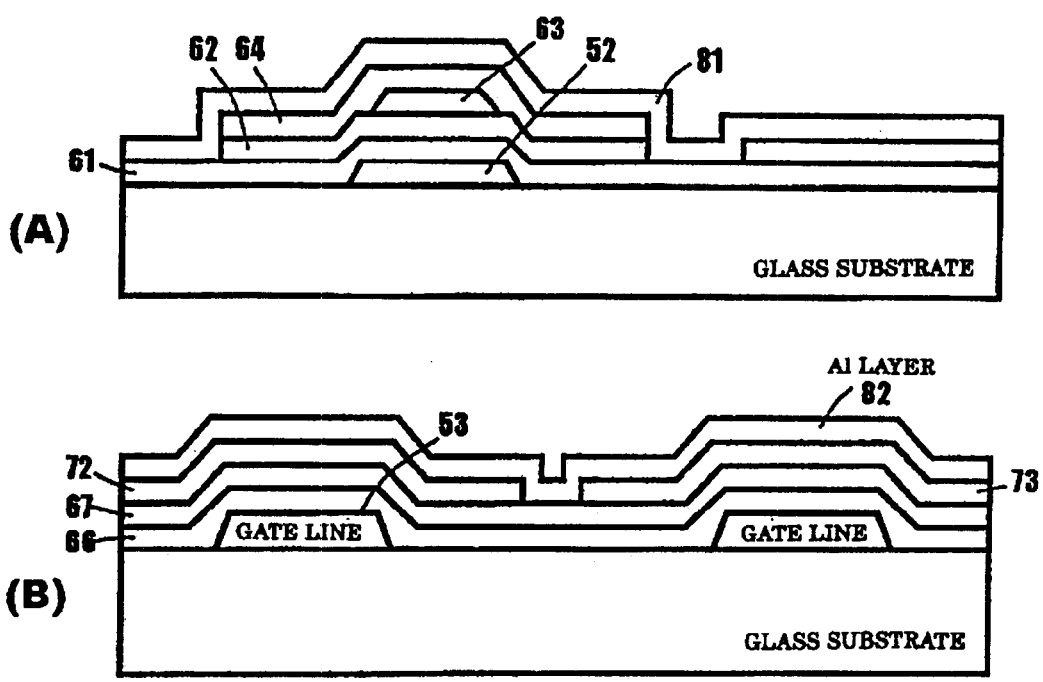
FIGS. 8(A) and 8(B) are constructional views schematically showing the method of forming a TFT array substrate wiring in the embodiment 1.
Figure 9:
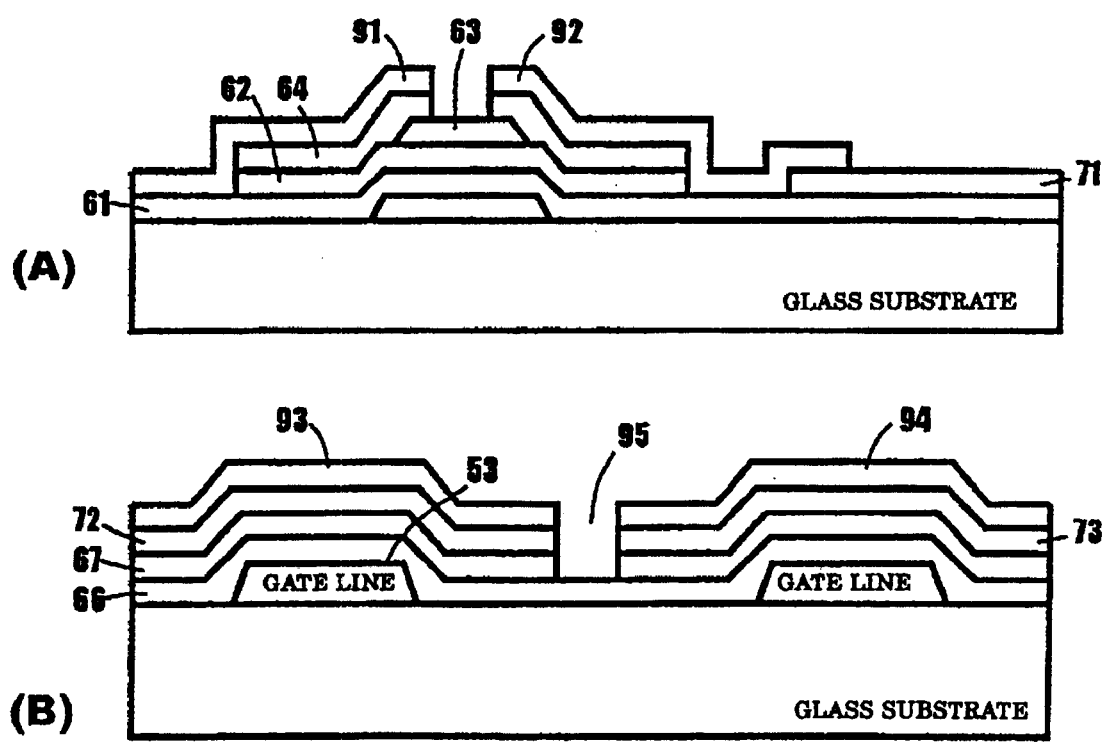
FIGS. 9(A) and 9(B) are constructional views schematically showing the method of forming a TFT array substrate wiring in the embodiment 1.

The Al layers 81 and 82 are deposited with a thickness of 1000 to 3000 angstrom on the full surface of the substrate by the sputtering method (FIG. 8) The Al layers are subjected to pattern forming by the photolithography process and the wet etching process (FIG. 9). The Al layers are formed as source/drain electrodes 91 and 92. Moreover, in the signal line and the dummy line, the Al layers are formed also as uppermost layers 93 and 94 of these lines. In the dummy line, the Al layers are subjected to pattern forming in a state where the Al layers are separated between the gate wirings. A gap 95 between the Al wirings is about 10 micrometers. In the wet etching process of the Al layer, after etching the Al layer, an exposed part of the Si layer 67 is also etched via a separating portion 74 of the ITO layer, and is disconnected. Accordingly, after the Al layers 93 and 94 are subjected to pattern forming, the dummy line is put in an electrically disconnected state between the gate lines 53.

The short rings on the outer peripheral area are formed simultaneously with the foregoing wiring patterns. Accordingly, after the Al layer as the uppermost layer has been subjected to pattern forming and the signal line has been completed, the short ring can function between each signal line and gate line. After the short ring started to function, the short circuit due to the electrostatic breakdown between the gate line and the signal line is effectively repressed by the short ring.

In this embodiment, since the dummy signal line as the short circuit wiring is formed on the outer peripheral area, it is possible to prevent the short circuit due to the electrostatic breakdown between the gate line as the lower layer wiring and the signal line as the upper layer wiring. Since the dummy wiring is disconnected after a specified step, it is possible to eliminate the short circuit between the gate lines even in the case where the dummy signal line is short-circuited with two or more gate lines. By disconnecting the dummy wiring between the gate lines, the short circuit between the gate lines can be prevented even in the case where any gate wiring and any dummy wiring are short-circuited. Note that, preferably, the dummy wiring has capacitance approximately equal to that of the signal line or more.

In this embodiment, the dummy wiring is disconnected at the time when the signal line is completed. This is because the short rings on the outer peripheral area function between each signal line and gate line, after completion of the signal line, and thus the short circuit due to the dielectric breakdown between the wirings can be prevented. Note that, this disconnecting processing of the dummy wiring is not limited to being performed at the time when the signal line is completed, but the disconnecting processing may be sufficiently performed at any time before a final product as a display is completed. In addition to the presence of the short ring, by providing the dummy wiring, it is possible to further secure the prevention of the short circuit. However, the dummy wiring may be disconnected in the etching step of the upper most layer of the signal line, thus it can be disconnected without adding a new step.

Note that the dummy line is not limited to the three-layer structure, but it is also possible to have two or less layers, alternatively four layers or more. In this embodiment, it is possible not to form the ITO layer as the second layer. However, the dummy wiring preferably has a capacitance approximately equal to or more than that of the signal line, in order to provide the aptitude of occurrence of the dielectric breakdown, more between the dummy line and the gate line than between the signal line and the gate line. Accordingly, it is desirable that the dummy wiring have the same composition as that of the signal line.

In this embodiment, in the case where the aluminum layer is etched by sputtering, it is also possible to etch the ITO and the silicon at the time when etching the Al, other than forming the ITO as to be divided into the plurality of wirings to disconnect the dummy signal line. In this case, the ITO layer is formed as one consecutive wiring similarly to the silicon layer. Moreover, even in the case where the aluminum layer is subjected to wet etching, if etchant thereof can etch the ITO as well as the Al, the ITO need not necessarily be formed to be divided. It is possible to etch amorphous ITO by typical etchant for Al. Note that, in the case where the ITO layer is deposited after the Al layer deposition, the ITO layer need not be formed on the dummy signal line. This is because sufficient capacitance of the dummy line is secured at the time when the Al layer is formed.

In this embodiment, after the ITO layer deposition, the Al layers of the dummy line and the signal line are deposited. However, the case where the ITO is deposited finally is also possible. In this case, Al and Si are etched when etching the ITO, and the dummy wiring is disconnected. As a matter of course, another case of formation of the Al layer being divided into a plurality of wirings is not eliminated. Moreover, it is possible to apply the present invention to a stagger type TFT.

Note that, in a top gate type TFT, since a wiring formed on the insulating layer is a gate wiring, the upper layer wiring has a one-layer structure in many cases. In the case where the gate line and the dummy signal line as the upper layer wirings are formed only of the Al layer, first, the dummy signal line is formed as one consecutive Al wiring. Thereafter, after completing the final product, the dummy signal line is disconnected. For example, it is disconnected immediately before electrically inspecting the TFT array. In this case, an additional step is required for the disconnecting processing. Note that the dummy line of the present invention is particularly effective in the case where the upper layer wiring has a plurality of layers.

Figure 10:
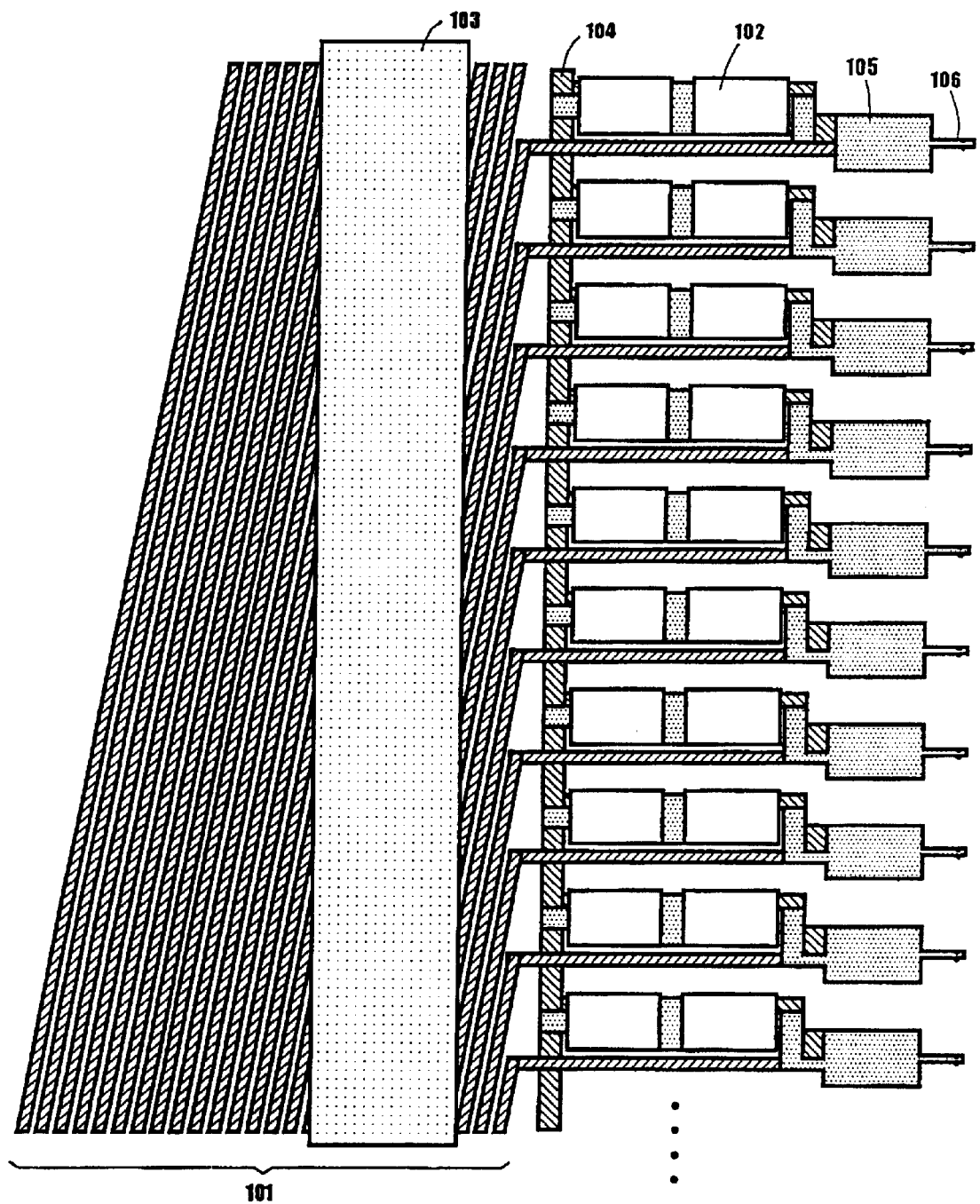
FIG. 10 is a constructional view schematically showing gate wiring drawing lines in the embodiment 2.

Description will be made for an aspect where the short circuit wiring is applied to a drawing line portion of the gate wiring as another embodiment. The line drawing portion of the gate wiring means a wiring of a portion where the gate wiring in the TFT array wiring is connected to the driver IC on the outer peripheral area. FIG. 10 is a constructional view schematically showing the drawing portion of the gate wiring, which is formed on the outer peripheral area of the TFT array substrate. In the drawing, reference numeral 101 denotes gate wiring drawing lines, reference numerals 102 are short rings, reference numerals 103 are silicon wiring. Each short ring 102 comprises two short rings connected in series, as shown in FIG. 4.

As described in the formation of the signal line, the silicon wiring 103 is formed from the a-Si layer and the n+a-Si layer as the ohmic layer of the TFT. The silicon wiring 103 is formed so as to cross the gate wiring drawing lines 101 via the oxide silicon layer. A thickness of the silicon wiring is similar to that of the silicon layer of the dummy line. Moreover, a line width of the silicon wiring is about 100 to 200 micrometers. A reference numeral 104 denotes a common circumferential line to which the short rings are connected; a numeral 105 pads; and a numeral 106 gate wirings. The gate wirings 106 and the common circumferential line 104 are not connected to each other.

Since the gate wiring drawing lines 101 are lines formed with a high density, the short circuit due to the electrostatic dielectric breakdown between the drawing lines is apt to occur. A gap between the drawing lines is about 20 micrometers, and a gap between the drawing line and the silicon line is about 3500 angstrom. Accordingly, the drawing lines adjacent to each other may not be short-circuited, but between the drawing lines and the upper silicon wiring, the short circuit due to the electrostatic breakdown will occur. The silicon wiring as the short circuit wiring is formed in the upper layer of the gate wiring drawing lines via the insulating layer, thus enabling the prevention of the short circuit between the gate wirings.

The silicon wiring is entirely removed in the same process as that of disconnecting the silicon layer of the dummy signal line in the first embodiment. By entirely removing the silicon wiring, the short circuit between the gate wirings can be eliminated, also in the case where the silicon wiring is short-circuited with two or more of the lower drawing lines in the lower layer.

It is also possible to form the gate drawing line between the gate line in the lower layer and the signal line in the upper layer on the insulating layer. In this case, the lower wiring and the upper wiring are electrically connected to each other via a through hole. In such a case, the short circuit wiring has a composition similarly to that of the signal line and has an Si lower layer, an ITO intermediate layer and an Al upper layer. Moreover, the whole short circuit wiring is not removed, but a part thereof is removed and disconnected. The short circuit wiring is disconnected among the gate wiring drawing lines. A width of the separating portion is about 10 micrometer though it varies depending on the density of the drawing lines.

In the above-described two embodiments, Al is used as the metal layer. However, as the metal wiring layer, Cr, Mo—Ta, Ta and the like can be used besides Al. As the gate insulating film or the protective film, Si oxide or Si nitride may be properly employed. It is also possible to use Ta2O5 deposited by the sputtering method as the insulating film. In this embodiment, a-Si is used as the semiconductor. However, it is naturally possible to form the TFT and the wiring by use of polysilicon.

The short circuit wiring of the present invention is not limited to the array wiring with the active element, and can be applied to a device without an active element such as a simple matrix type device. Moreover, though the description has been made exemplifying the TFT as the active element, the dummy wiring of the present invention can be also applied to array wirings with other active element such as MIM. The present invention can be applied to other display devices such as an organic electro-luminescence type display device, and is not limited to the liquid crystal display device.

Although the preferred embodiments of the present invention have been described in detail, it should be understood that various changes, substitutions and alternations can be made therein without departing from spirit and scope of the inventions as defined by the appended claims.

What is claimed is:

1. A method of manufacturing a display device with a display area having a plurality of sub-pixels disposed in the form of matrix, said method comprising the steps of:

forming a plurality of lower layer wirings on a substrate, the lower layer wirings transmitting electric signals to said plurality of sub-pixels;

forming an insulating layer on the plurality of lower layer wirings;

forming a plurality of upper layer wirings and a short circuit wiring on said insulating layer, the upper layer wirings transmitting electric signals to said plurality of sub-pixels, and the short circuit wiring being at the outside of said plurality of upper layer wirings and at the outside of said display area; and removing said whole short circuit wiring, alternatively removing a part thereof to electrically disconnect said short circuit wiring.

2. The method of manufacturing a display device according to claim 1, wherein said step of forming said short circuit wiring is formed simultaneously with said upper layer wirings, and said short circuit wiring is removed when said upper layer wirings are etched.

3. The method of manufacturing a display device according to claim 1,
wherein said step of forming said short circuit further includes providing said short circuit wiring with a plurality of layers, and
said removing step removes a part of a lower layer of said short circuit wiring to electrically disconnect said short circuit wirings when an upper layer thereof is etched.

4. The method of manufacturing a display device according to claim 1, further comprising the step of forming said short circuit wiring with the same composition as that of said upper layer wirings.

5. The method of manufacturing a display device according to claim 1, further comprising the step of forming said short circuit wiring with a capacitance approximately equal to, alternatively more than that of said upper layer wirings.

6. The method of manufacturing a display device according to claim 1,
wherein said step of forming said lower layer wirings are formed as gate lines connected to gates of TFTs formed on said sub-pixels,
said upper layer wirings are formed as signal lines connected to source/drain electrodes of said TFTs,
said short circuit wiring are formed to have the same composition as that of said signal lines, and is formed simultaneously with said signal lines, and
said signal lines and said short circuit wiring are formed to have an Si lower layer and an Al upper layer, and said Si lower layer is disconnected when said Al upper layer is etched.

7. The method of manufacturing a display device according to claim 6,
wherein said step of forming said signal lines and said short circuit wiring further include the step of forming an ITO intermediate layer between said Si lower layer and said Al upper layer,
said ITO intermediate layer is formed, being separated into a plurality of wirings, and
said Si lower layer is disconnected at a part exposed from a separating portion of said ITO intermediate layer.

8. A method of manufacturing a display device with a display area having a plurality of sub-pixels disposed in the form of matrix, said method comprising the steps of:
forming a plurality of lower layer wirings on a substrate, said plurality of lower layer wirings transmitting electric signals to said plurality of sub-pixels;
forming an insulating layer on said plurality of lower layer wirings;
forming a plurality of upper layer wirings and a short circuit wiring on said insulating layer, the upper layer wirings transmitting electric signals to said plurality of sub-pixels; and
removing said whole short circuit wiring, alternatively removing a part thereof to electrically disconnect said short circuit wiring,
wherein a short circuit due to dielectric breakdown between said short circuit wiring and said lower layer wirings is more apt to occur than between said upper layer wirings and said lower layer wirings, alternatively between said lower layer wirings.

9. A display device with a display area constituted of a plurality of sub-pixels disposed in the form of matrix, comprising:
a substrate;
a plurality of lower layer wirings sending electric signals to said plurality of sub-pixels, the lower layer wirings being formed on said substrate;
an insulating layer formed on said plurality of lower layer wirings;
a plurality of upper layer wirings sending electric signals to said plurality of sub-pixels, the upper layer wirings being formed on said insulating layer; and
a short circuit wiring formed at the outside of said plurality of upper layer wirings and at the outside of said display area, the short circuit wirings being formed on said insulating layer,
wherein said whole short circuit wiring is removed, alternatively a part thereof is removed after being formed, to be electrically disconnected.

10. The display device according to claim 9, wherein said short circuit wiring has the same composition as that of said upper layer wirings.

11. The display device according to claim 9, wherein said short circuit wiring has capacitance approximately equal to or more than that of said upper layer wirings.

12. A wiring board, comprising:
a plurality of lower layer wirings formed on a substrate;
an insulating layer formed on said lower layer wirings;
a plurality of upper layer wirings formed on said insulating layer;
a short circuit wiring repressing a short circuit between said upper layer wirings, alternatively between said lower layer wirings, by short-circuiting with said lower layer wirings via said insulating layer, the short circuit wiring being formed on said insulating layer,
wherein said short circuit wiring is removed, alternatively a part thereof is removed after being formed, to be electrically disconnected.

13. A display device with a display area constituted of a plurality of sub-pixels disposed in the form of matrix, comprising:
a substrate;
a plurality of lower layer wirings sending electric signals to said plurality of sub-pixels, the lower layer wirings being formed on said substrate;
an insulating layer formed on said plurality of lower layer wirings;
a plurality of upper layer wirings sending electric signals to said plurality of sub-pixels, the upper layer wirings being formed on said insulating layer; and
a short circuit wiring formed on said insulating layer,
wherein said short circuit wiring is short-circuited with said lower layer wirings via said insulating layer, and
said short circuit wiring is electrically disconnected after being formed.

* * * * *